United States Patent
Enkirch et al.

(10) Patent No.: US 12,132,180 B2
(45) Date of Patent: Oct. 29, 2024

(54) BATTERY COOLING ELEMENT; BATTERY MODULE UNIT AND BATTERY MODULE

(71) Applicant: KAUTEX TEXTRON GMBH & CO. KG, Bonn (DE)

(72) Inventors: Georg Enkirch, Salz (DE); Felix Haas, Bonn (DE); Moritz Lipperheide, Bonn (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 913 days.

(21) Appl. No.: 17/250,729

(22) PCT Filed: Aug. 27, 2019

(86) PCT No.: PCT/EP2019/072788
§ 371 (c)(1),
(2) Date: Feb. 25, 2021

(87) PCT Pub. No.: WO2020/043697
PCT Pub. Date: Mar. 5, 2020

(65) Prior Publication Data
US 2021/0226275 A1     Jul. 22, 2021

(30) Foreign Application Priority Data

Aug. 31, 2018  (DE) ................. 10 2018 214 829.5
Nov. 27, 2018  (DE) ................. 10 2018 129 908.7

(51) Int. Cl.
*H01M 10/613* (2014.01)
*H01M 10/04* (2006.01)
(Continued)

(52) U.S. Cl.
CPC ..... *H01M 10/613* (2015.04); *H01M 10/0481* (2013.01); *H01M 10/647* (2015.04);
(Continued)

(58) Field of Classification Search
CPC .......... H01M 10/613; H01M 10/6557; H01M 10/65; H01M 10/6556; H01M 10/656–6568; H01M 10/653
See application file for complete search history.

(56) References Cited

U.S. PATENT DOCUMENTS 5,205,348 A    4/1993  Tousignant et al.
11,145,918 B2  10/2021 Kalmbach et al.
(Continued)

FOREIGN PATENT DOCUMENTS

CN    102318104   1/2012
CN    107910616   4/2018
(Continued)

OTHER PUBLICATIONS

International Search Report, mailed Feb. 3, 2020, received in corresponding PCT Application No. PCT/EP2019/072788.
(Continued)

*Primary Examiner* — Jeremiah R Smith
(74) *Attorney, Agent, or Firm* — Grossman, Tucker Perreault & Pfleger, PLLC

(57) ABSTRACT

The invention relates to a battery cooling element having: an outer surface for resting at least in regions against a battery cell and/or for resting at least in regions against a battery module comprising at least two battery cells; an inner chamber for receiving a cooling medium, which inner chamber is surrounded at least in regions by the outer surface; and a cooling medium inlet connected to the inner chamber and a cooling medium outlet connected to the inner chamber, wherein the outer surface is made, at least in regions, of a thermally conductive, flexible film which can be shaped by a fluid pressure of the cooling medium.

33 Claims, 6 Drawing Sheets

(51) Int. Cl.
  *H01M 10/647* (2014.01)
  *H01M 10/653* (2014.01)
  *H01M 10/6557* (2014.01)
  *H01M 50/204* (2021.01)
  *H01M 50/227* (2021.01)
  *H01M 50/271* (2021.01)

(52) U.S. Cl.
  CPC ..... *H01M 10/653* (2015.04); *H01M 10/6557* (2015.04); *H01M 50/204* (2021.01); *H01M 50/227* (2021.01); *H01M 50/271* (2021.01)

(56) References Cited

U.S. PATENT DOCUMENTS

| | | | | |
|---|---|---|---|---|
| 2009/0087727 | A1* | 4/2009 | Harada | H01M 10/613 |
| | | | | 429/120 |
| 2009/0169978 | A1* | 7/2009 | Smith | H01M 50/358 |
| | | | | 429/82 |
| 2011/0052960 | A1* | 3/2011 | Kwon | H01M 10/0481 |
| | | | | 429/120 |
| 2011/0206964 | A1* | 8/2011 | Odumodu | H01M 10/6557 |
| | | | | 165/104.19 |
| 2012/0164507 | A1 | 6/2012 | Lachenmeier et al. | |
| 2013/0071720 | A1* | 3/2013 | Zahn | H01M 50/211 |
| | | | | 29/890.039 |
| 2013/0149582 | A1 | 6/2013 | Kimura et al. | |
| 2014/0178737 | A1 | 6/2014 | Obrist et al. | |
| 2015/0200429 | A1* | 7/2015 | Lee | H01M 10/613 |
| | | | | 429/120 |
| 2015/0270586 | A1 | 9/2015 | Wang et al. | |
| 2016/0359211 | A1 | 12/2016 | Kenney et al. | |
| 2017/0176108 | A1 | 6/2017 | Palanchon et al. | |
| 2020/0328486 | A1* | 10/2020 | Kwon | H01M 10/0481 |
| 2021/0167444 | A1* | 6/2021 | Gaigg | H01M 10/613 |

FOREIGN PATENT DOCUMENTS

| | | |
|---|---|---|
| DE | 102010021922 | 12/2011 |
| DE | 102011075820 | 11/2012 |
| DE | 102012217367 | 3/2014 |
| DE | 102015217780 | 3/2017 |
| DE | 102016212273 | 1/2018 |
| DE | 102017208754 | 11/2018 |
| DE | 102017113973 | 12/2018 |
| DE | 102017210343 | 12/2018 |
| JP | 2014107038 | 6/2014 |
| JP | 2020068066 | 4/2020 |
| WO | 2011/088997 | 7/2011 |
| WO | WO-2018234098 A1 * | 12/2018 |

OTHER PUBLICATIONS

Office Action from related Japanese Appln. No. 2021-510671, dated Apr. 25, 2022. English translation attached.
International Preliminary Report on Patentability, mailed Feb. 3, 2021, received in corresponding PCT Application No. PCT/EP2019/072788.

* cited by examiner

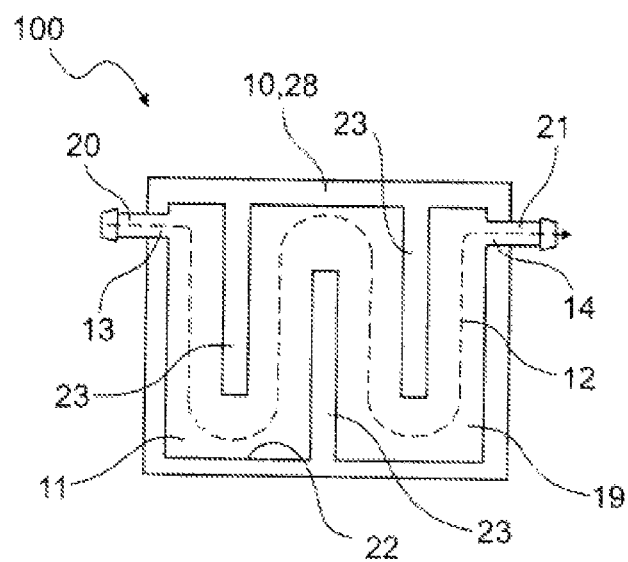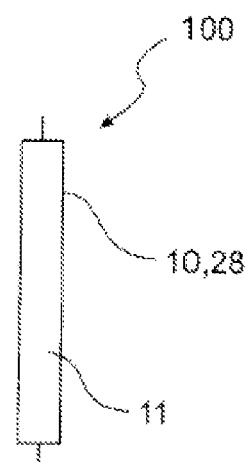
Fig. 3a    Fig. 3b
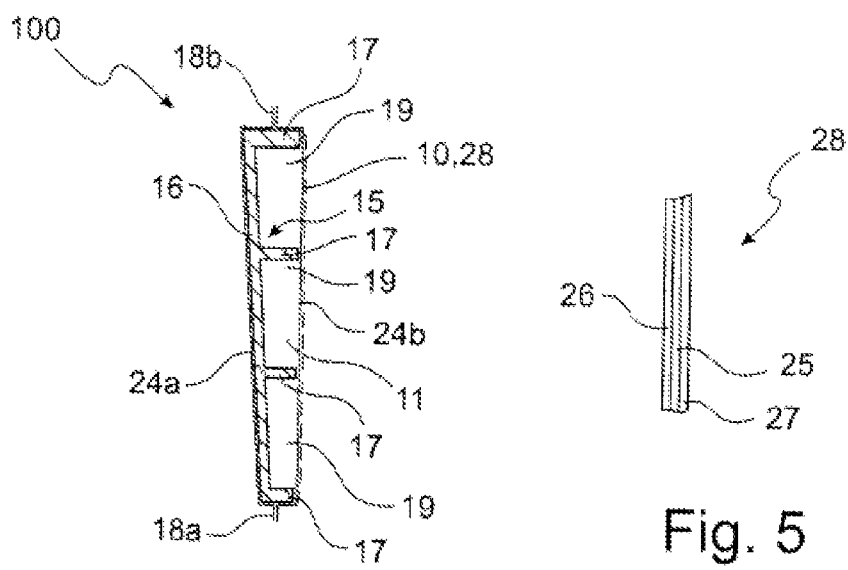
Fig. 4    Fig. 5

BATTERY COOLING ELEMENT; BATTERY MODULE UNIT AND BATTERY MODULE

FIELD

The invention relates to a battery cooling element which can be arranged in a battery module and/or a battery module unit. The invention also relates to a battery module unit and a battery module.

BACKGROUND

Battery module units, which can be used for example in motor vehicles, usually comprise a housing in which one or more battery modules or two or more battery cells, which can be combined to form battery modules, are arranged. Since the battery modules generate heat during operation, one or more battery cooling elements are also usually arranged in the housing, which cooling elements, as heat exchangers, absorb the heat from the battery modules and transport it out of the housing. The battery cooling elements are generally rigid, since they are generally arranged on the underside of the housing and can therefore also assume a load-bearing function. In order to ensure sufficient heat transfer, thermally conductive pastes or films are often applied between the battery cooling elements and the battery modules. The battery cooling elements are very heavy as a result of their rigid design. This weight has to be absorbed by the housing, and therefore the housing is also made from a rigid material, which is also very heavy. The entire battery module unit therefore has an undesirably heavy weight.

SUMMARY

The problem addressed by the invention is therefore that of providing a battery cooling element, a battery module unit and a battery module which are distinguished by a reduced weight.

The battery cooling element according to the invention comprises an outer surface for resting at least in regions against a battery cell or against a battery module of the battery module unit that comprises at least two battery cells, an inner chamber for receiving a cooling medium, which inner chamber is surrounded at least in regions by the outer surface, a cooling medium inlet connected to the inner chamber, and a cooling medium outlet connected to the inner chamber, wherein the outer surface is made, at least in regions, of a thermally conductive, flexible film which can be shaped by a fluid pressure of the cooling medium.

According to the invention, the outer surface of the battery cooling element is now no longer rigid, but instead the outer surface of the battery cooling element, by means of which surface the battery cooling element rests at least in regions against the battery module to be cooled or against the battery cell to be cooled, is flexible and can therefore be shaped, at least in regions. In this case, the outer surface is made, at least in regions, of a thermally conductive, flexible film. The flexible film can be deformed by a cooling medium, for example a cooling fluid such as water, arranged in the inner chamber of the battery cooling element. The film can be formed on one or on both longitudinal side surfaces of the outer surface of the battery cooling element. Furthermore, the film can also be formed on the transverse sides of the outer surface of the battery cooling element. The outer surface of the battery cooling element is preferably formed in particular on the longitudinal side surface of the outer surface by a corresponding film, by means of which the battery cooling element rests against the battery cell to be cooled and/or against the battery module to be cooled. The cooling medium can flow into the inner chamber of the battery cooling element via the cooling medium inlet, flow through the inner chamber and flow back out of the inner chamber via the cooling medium outlet. Depending on the fluid pressure of the cooling medium when flowing through the inner chamber, the film can be deformed outward, in particular bulged outward, in the direction of the battery module to be cooled, such that the film and therefore the outer surface of the battery cooling element rest against the outer surface of the battery module or against the outer surface of the battery cell, and thus flat contact can be established between the battery cooling element and the battery module or battery cell. By adjusting the fluid pressure of the cooling medium, it is also possible to adjust the effectiveness of the heat transfer from the battery module to the battery cooling element. In addition, the flexibility of the outer surface of the battery cooling element can compensate for possible tolerances. Because the film is also made of a thermally conductive material, effective heat transfer between the battery module or battery cell and the battery cooling element can be achieved without the need to use thermally conductive pastes. A film is also distinguished from other materials by a thin wall thickness, as a result of which the film has a low thermal resistance. A battery cooling element designed in this manner also has a significantly reduced weight by comparison with conventional battery cooling elements due to the outer surface no longer being rigid. The battery cooling element can also have a flat design, so that it can be particularly space-efficient. At least in regions means that the outer surface of the battery cooling element, which outer surface is flexibly formed by the film, does not have to extend over the entire periphery of the battery cooling element; rather, it is also possible for this specially formed outer surface to form only part of the outer peripheral surface of the battery cooling element. The film then preferably only extends over part of the outer peripheral surface of the battery cooling element. However, it is also possible for the outer surface and therefore also the film forming the outer surface to extend over the entire outer peripheral surface of the battery cooling element.

The film is preferably formed from a multilayer composite. Forming said film from a multilayer composite can increase the stability of the film. For example, depending on the materials in the film, said film can have increased tensile strength and/or tear strength, such that damage to the film can be avoided even in the event of higher forces acting on the film. In addition, certain properties of the film can be adjusted in a more targeted manner by means of a multilayer composite. For example, the weldability of the film can be improved when said film is formed from a multilayer composite.

Different materials can be combined with one another in the multilayer composite. For example, the multilayer composite can comprise a plastics material and a metal material, each of which is in the form of a film layer. In particular, the metal material can improve the electromagnetic compatibility (EMC) of the film. Electromagnetic compatibility describes the ability of an element not to interfere with other elements through undesired electrical or electromagnetic effects or not to be interfered with by other elements. For example, the multilayer composite can be designed in such a way that a middle film layer is made of a metal material and the two outer layers covering the middle film layer are made of a plastics material.

For example, an aluminum material or a copper material can be used as the metal material. The metal material can be applied by vapor deposition, for example.

The plastics material can be made, for example, of a polyethylene, in particular tear-resistant polyethylene, polyisobutylene, polyvinyl butyral, ethylene vinyl acetate, polyacrylate, polymethylene acrylate, polyurethane, pre-stretched polypropylene, polyvinyl acetate 5, ethylene vinyl acetate and/or a thermoplastic elastomer based on urethane.

However, it is also possible for the multilayer composite to be made of a plurality of different plastics materials and to not comprise any metal material.

In order to further increase the stability of the battery cooling element, a support element can be arranged in the inner chamber of the battery cooling element. The support element can form a bearing structure which can provide mechanical support for the outer surface of the battery cooling element and thus for the film. The support element can be used to absorb and transmit pressure loads. The support element is preferably shaped such that it forms one or more flow channels through which the cooling medium can flow in the inner chamber of the battery cooling element. The flow channel or the flow channels can be designed in such a way that the flow path of the cooling medium from the cooling medium inlet to the cooling medium outlet is as long as possible, so that the cooling medium can absorb a lot of heat and thus the largest possible amount of heat can be transported away from the battery modules. As a result, the battery modules can be cooled particularly effectively. The support element can, for example, be in the form of a framework in order to support the outer surface of the battery cooling element. The support element is preferably made of a rigid material, in particular a rigid plastics material. However, it is also possible for the support element to be made of a metal material.

For example, the support element can have a meandering shape. The meandering shape can improve the guidance of the cooling medium in the inner chamber of the battery cooling element, such that the cooling capacity of the cooling medium can be used particularly effectively when it flows through the inner chamber. In a meandering configuration, the support element preferably comprises a plurality of U-shaped flow channels arranged one behind the other, the flow channels preferably extending parallel to one another.

It is also possible for the support element to comprise a main rib and at least two secondary ribs aligned at a 90° angle with respect to the main rib. At least two flow channels for the cooling medium are also formed in a configuration of this kind. Depending on the number of secondary ribs, it is also possible to form more than two flow channels which also extend parallel to one another.

The support element can be resilient in regions or completely resilient. A resilient design of the support element can result in said support element sealingly resting against the film, even when the film bulges outward. The support element can then sealingly rest against the inside of the film that faces toward the inner chamber. By sealingly resting thereagainst, the support element can form an overflow seal which prevents the cooling medium from flowing through a gap between the film and the support element and thus leaving the actual path of the flow channel.

Furthermore, it is also possible for no support element to be provided and for the stability of the film to be ensured solely by the fluid pressure of the cooling medium when it flows through the inner chamber of the battery cooling element. For example, the film can be shaped such that the film forms a meandering flow channel in the inner chamber of the battery cooling element. For this purpose, for example, walls that protrude into the inner chamber can be formed on an inside of the film that faces the inner chamber, which walls are formed as one piece with the film and are thus made of the same material as the film. The walls can form ribs which are aligned at a right angle with respect to the inside of the film. These walls can form a meandering flow channel in the inner chamber of the battery cooling element for the cooling medium.

The battery cooling elements and therefore the outer surface of a battery cooling element are preferably rectangular. However, it is also possible for a battery cooling element to be wedge-shaped, in that the outer surface of the battery cooling element is shaped like a wedge. Such wedge-shaped battery cooling elements can, for example, be arranged on the edges of a battery module unit such that, by means of these wedge-shaped battery cooling elements, tolerances can be compensated for and the battery modules arranged in a row can simultaneously be braced.

The cooling medium inlet can comprise an inlet connector and the cooling medium outlet can comprise an outlet connector. In order to be able to obtain good and secure integration of the inlet connector and the outlet connector, the inlet connector and the outlet connector can be welded to the film forming the outer surface. The welded connection can produce a liquid-tight connection between the inlet connector or the outlet connector and the outer surface or the film of the battery cooling element.

The problem addressed by the invention is also solved by means of a battery module unit which comprises a housing comprising a top side and an underside, at least one battery cooling element, and at least two battery cells and/or at least one battery module comprising at least two battery cells, the battery cooling element being designed and developed as described above.

On account of the battery cooling element as described above, a battery module unit of this kind dissipates heat from the battery cells or the battery modules particularly effectively and thus cools the battery cells or battery modules particularly effectively, it also being possible to simultaneously reduce the weight of the battery module unit due to the reduced weight of the battery cooling elements.

At least two battery cooling elements are preferably arranged in the housing, which battery cooling elements can each be arranged so as to be aligned vertically with respect to the underside of the housing. Therefore, the battery cooling elements are preferably arranged so as to be standing perpendicularly on the underside of the housing or are preferably arranged so as to be hanging perpendicularly with respect to the underside of the housing. As a result of arranging the battery cooling elements to be perpendicularly standing or perpendicularly hanging, it is possible to transfer heat horizontally from the battery module(s) or battery cells to the battery cooling elements, so that the heat can then be transferred parallel to the extension of the underside of the housing.

If two or more battery cells are arranged in the housing, a battery cooling element is preferably arranged between each two battery cells arranged adjacent to one another. The battery cells are preferably arranged next to one another in a row. The two battery cells arranged at the end of the row preferably do not rest directly against the housing, but instead a battery cooling element is preferably also arranged between the housing and each of the battery cells arranged at the end of the row. Two or more battery cells can be combined in one battery module, a corresponding battery cooling element then preferably also being arranged in the battery module between each of the battery cells arranged therein. A battery cooling element is preferably also arranged between each of the battery modules. A battery cooling element is preferably also arranged between a battery module and the housing.

If one or more battery modules or two or more battery cells are arranged in the housing, the battery modules or the battery cells can preferably be arranged in the housing so as to be self-supporting, and therefore the housing does not have to assume a load-bearing function. In order to achieve this, the battery module unit can, for example, comprise a bracing element by means of which the at least two battery cells and/or the at least one battery module can be held braced in a horizontal direction extending parallel to the alignment of the underside. The bracing element is preferably arranged in the housing and surrounded by the housing. The bracing element can absorb the forces from the battery modules or the battery cells and also from the battery cooling elements, so that these forces are not transmitted to the housing. The battery modules or the battery cells and the battery cooling elements of a battery module unit can be combined in the form of a packet and held braced in the horizontal direction as a packet in the bracing element. The bracing element can thus absorb the weight of the battery modules or the battery cells and the battery cooling elements. The bracing element can therefore form a bearing element for the battery modules or the battery cells and the battery cooling elements. The bracing element can press the battery modules or battery cells and battery cooling elements arranged in a packet against one another such that they are held braced against one another, without the need for additional fastening elements for the battery modules or battery cells and/or the battery cooling elements in the housing. As a result of the horizontal bracing, the bracing element absorbs weight perpendicularly to the extension of the underside of the housing. The bracing element can allow the battery modules or battery cells and battery cooling elements to be arranged in an accurately positioned manner and held in an accurately positioned manner in the housing, such that undesired slipping of the battery modules or the battery cells and/or the battery cooling elements with respect to one another can be prevented. Horizontal bracing by means of the bracing element can also compensate for manufacturing tolerances. In addition, the overall rigidity of the battery module unit can be increased by means of horizontal bracing.

The bracing element is preferably in the form of a frame and can enclose the at least two battery cells and/or the at least one battery module. Together with the battery cells or the battery modules, the bracing element also encloses the battery cooling elements which are arranged in a packet with the battery cells or the battery modules. As a result of the frame-like design, the bracing element can be arranged peripherally around the battery cells or the battery modules and the battery cooling elements.

In order to be able to increase or improve the effect of the horizontal bracing by means of the bracing element, two opposing transverse sides of the bracing element can be inclined at an angle $\alpha>0°$ with respect to a vertical Z-axis. As a result of the inclined arrangement of the two transverse sides of the bracing element, the position of the battery modules or the battery cells and the battery cooling elements can be securely maintained, such that unwanted slipping or tilting of the battery modules or the battery cells and the battery cooling elements can be prevented. In addition, tolerances can be compensated for thereby. The two transverse sides are preferably inclined at the same angle $\alpha$. The transverse sides are preferably inclined in such a way that they are arranged so as to extend toward one another in the direction of the underside of the housing, so that the space between the two transverse sides tapers in the direction of the underside of the housing. The angle $\alpha$ can be, for example, between 2° and 45°, preferably between 5° and 30°.

If the opposing transverse sides of the bracing element are inclined with respect to one another, a battery cooling element which comprises a wedge-shaped outer surface can be arranged between each of the transverse sides of the bracing element and a battery module of the at least one battery module and/or a battery cell of the at least two battery cells. The wedge shape of the battery cooling element can interact with the inclined arrangement of the relevant transverse side against which the battery cooling element rests. Due to the wedge shape, the transmission of contact pressure from the bracing element via the battery cooling element to the battery modules or the battery cells can be improved.

In order to be able to further improve the positioning of the individual elements in a battery module unit, the battery cooling element can also be acted upon by a force acting vertically on the battery cooling element. The vertically acting force preferably acts perpendicularly to the contact pressure of the bracing element. The vertically acting force can be applied to the battery cooling element by a pulling element or a pressing element, for example. A pulling element can be provided, for example, which is fastened to the battery cooling element and the housing and/or the bracing element in order to apply the vertically acting force. The vertically acting force can be advantageous, particularly in combination with a wedge shape of a battery cooling element and an inclined arrangement of a transverse side of the bracing element.

Moreover, at least one of the at least one battery cooling elements is arranged so as to be aligned horizontally with respect to the underside of the housing. In this embodiment, one or more battery cooling elements are thus also arranged between the underside of the housing and the battery modules or the battery cells.

In order to be able to reduce the weight of the battery module unit further, the housing can be made of a plastics material. In particular if a bracing element is provided, the housing no longer has to have a load-bearing function, and therefore the housing can then be made of a very light material, in particular a very light plastics material. For example, polyethylene or polyamide can be used as the plastics material.

It is also possible for the battery cooling element to be integrated into the housing. The battery cooling element can therefore already be formed as part of the housing of the battery module unit. The battery cooling element is preferably formed on the underside of the housing such that the longitudinal side surface of said element extends horizontally and thus parallel to the underside of the housing. The battery modules and/or the battery cells can then be arranged on the battery cooling element such that the battery modules and/or the battery cells can be cooled from below, i.e. on their underside, by means of the battery cooling element.

Part of an outer peripheral surface of the battery cooling element is preferably formed by the underside of the housing, whereby the number of required parts can be reduced.

The film of the battery cooling element can preferably be fastened to the housing. For example, the film can be integrally fastened to the housing, for example by means of welding, adhesively bonding and/or injection molding. In order to provide a contact surface for fastening the film to the housing, a rib can be provided on the inside of the housing, which rib is preferably formed peripherally on the inside. The film can be fastened to the rib which protrudes into the inner chamber of the housing.

It can also be possible for the housing to comprise a bearing element to which the film of the battery cooling element is fastened. The bearing element can be formed as one piece with the housing or can be formed as a separate part from the housing. The bearing element can be shaped such that it can form one or more flow channels of the battery cooling element.

The problem addressed by the invention is also solved by means of a battery module which comprises a housing, at least two battery cells arranged in the housing, and at least one battery cooling element arranged in the housing, the battery cooling element being designed and developed as described above.

On account of the battery cooling element as described above, a battery module of this kind dissipates heat from the battery cells particularly effectively and thus cools the battery cells particularly effectively, it also being possible to simultaneously reduce the weight of the battery module due to the reduced weight of the battery cooling elements.

At least two battery cooling elements are preferably arranged in the housing, which battery cooling elements can each be arranged so as to be aligned vertically with respect to an underside of the housing. Therefore, the battery cooling elements are preferably arranged so as to be standing perpendicularly on the underside of the housing or are preferably arranged so as to be hanging perpendicularly with respect to the underside of the housing. As a result of arranging the battery cooling elements to be perpendicularly standing or perpendicularly hanging, it is possible to transfer heat horizontally from the battery cells to the battery cooling elements, so that the heat can then be transferred parallel to the extension of the underside of the housing.

If two or more battery cells are arranged in the housing, a battery cooling element is preferably arranged between each two battery cells arranged adjacent to one another. The battery cells are preferably arranged next to one another in a row. The two battery cells arranged at the end of the row preferably do not rest directly against the housing, but instead a battery cooling element is preferably also arranged between the housing and each of the battery cells arranged at the end of the row.

If two or more battery cells are arranged in the housing, the battery cells can preferably be arranged in the housing so as to be self-supporting, and therefore the housing does not have to assume a load-bearing function. In order to achieve this, the battery module can, for example, comprise a bracing element by means of which the at least two battery cells and the at least one battery cooling element can be held braced in a horizontal direction extending parallel to the alignment of the underside. The bracing element is preferably arranged in the housing and surrounded by the housing. The bracing element can absorb the forces from the battery cells and also from the battery cooling elements, so that these forces are not then transmitted to the housing. The battery cells and the battery cooling elements of a battery module unit can be combined in the form of a packet and held braced in the horizontal direction as a packet in the bracing element. The bracing element can thus absorb the weight of the battery cells and the battery cooling elements. The bracing element can thus form a bearing element for the battery cells and the battery cooling elements. The bracing element can press the battery cells and battery cooling elements arranged in a packet against one another such that they are held braced against one another, without the need for additional fastening elements for the battery cells and/or the battery cooling elements in the housing. As a result of the horizontal bracing, the bracing element absorbs weight perpendicularly to the extension of the underside of the housing. The bracing element can allow the battery cells and battery cooling elements to be arranged in an accurately positioned manner and held in an accurately positioned manner in the housing, such that undesired slipping of the battery cells and/or the battery cooling elements with respect to one another can be prevented. Horizontal bracing by means of the bracing element can also compensate for manufacturing tolerances. In addition, the overall rigidity of the battery module can be increased by means of horizontal bracing.

The bracing element is preferably in the form of a frame and can enclose the at least two battery cells and the at least one battery module. Together with the battery cells, the bracing element therefore also encloses the battery cooling elements which are arranged in a packet with the battery cells. As a result of the frame-like design, the bracing element can be arranged peripherally around the battery cells and the battery cooling elements.

In order to be able to increase or improve the effect of the horizontal bracing by means of the bracing element, two opposing transverse sides of the bracing element can be inclined at an angle β>0° with respect to a vertical Z-axis. As a result of the inclined arrangement of the two transverse sides of the bracing element, the position of the battery cells and the battery cooling elements can be securely maintained, such that unwanted slipping or tilting of the battery cells and the battery cooling elements can be prevented. In addition, tolerances can be compensated for thereby. The two transverse sides are preferably inclined at the same angle β. The transverse sides are preferably inclined in such a way that they are arranged so as to extend toward one another in the direction of the underside of the housing, so that the space between the two transverse sides tapers in the direction of the underside of the housing. The angle β can be, for example, between 2° and 45°, preferably between 5° and 30°.

If the opposing transverse sides of the bracing element are inclined with respect to one another, a battery cooling element which comprises a wedge-shaped outer surface can be arranged between each of the transverse sides of the bracing element and a battery cell of the at least two battery cells. The wedge shape of the battery cooling element can interact with the inclined arrangement of the relevant transverse side against which the battery cooling element rests. Due to the wedge shape, the transmission of contact pressure from the bracing element via the battery cooling element to the battery cells can be improved.

In order to be able to further improve the positioning of the individual elements in a battery module, the battery cooling element can also be acted upon by a force acting vertically on the battery cooling element. The vertically acting force preferably acts perpendicularly to the contact pressure of the bracing element. The vertically acting force can be applied to the battery cooling element by a pulling element or a pressing element, for example. A pulling element can be provided, for example, which is fastened to the battery cooling element and the housing and/or the bracing element in order to apply the vertically acting force. The vertically acting force can be advantageous, particularly in combination with a wedge shape of a battery cooling element and an inclined arrangement of a transverse side of the bracing element.

In order to be able to reduce the weight of the battery module further, the housing can be made of a plastics material. In particular if a bracing element is provided, the housing no longer has to have a load-bearing function, and therefore the housing can then be made of a very light material, in particular a very light plastics material. For example, polyethylene or polyamide can be used as the plastics material.

The battery module can be arranged in a battery module unit designed and developed as described above. A battery module unit can therefore comprise one or more battery modules as described above.

The problem addressed by the invention is also solved by means of a battery module unit which comprises a housing comprising a top side and an underside, at least two battery cells and/or at least one battery module comprising at least two battery cells, and a bracing element by means of which the at least two battery cells and/or the at least one battery module are held braced in a horizontal direction extending parallel to the alignment of the underside.

If one or more battery modules or two or more battery cells are arranged in the housing, the battery modules or the battery cells can preferably be arranged in the housing so as to be self-supporting, and therefore the housing does not have to assume a load-bearing function. In order to achieve this, the battery module unit comprises a bracing element by means of which the at least two battery cells and/or the at least one battery module can be held braced in a horizontal direction extending parallel to the alignment of the underside. The bracing element is preferably arranged in the housing and surrounded by the housing. The bracing element can absorb the forces from the battery modules or the battery cells and also from the battery cooling elements, if these are provided, so that these forces are not transmitted to the housing. The battery modules or the battery cells and optionally the battery cooling elements of a battery module unit can be combined in the form of a packet and held braced in the horizontal direction as a packet in the bracing element. The bracing element can thus absorb the weight of the battery modules or the battery cells and, if present, the battery cooling elements. The bracing element can thus form a bearing element for the battery modules or the battery cells and the optionally provided battery cooling elements. The bracing element can press the battery modules or battery cells and optionally provided battery cooling elements arranged in a packet against one another such that they are held braced against one another, without the need for additional fastening elements for the battery modules or battery cells and/or the battery cooling elements in the housing. As a result of the horizontal bracing, the bracing element absorbs weight perpendicularly to the extension of the underside of the housing. The bracing element can allow the battery modules or battery cells and the optionally provided battery cooling elements to be arranged in an accurately positioned manner and held in an accurately positioned manner in the housing, such that undesired slipping of the battery modules or the battery cells and/or the battery cooling elements with respect to one another can be prevented. Horizontal bracing by means of the bracing element can also compensate for manufacturing tolerances. In addition, the overall rigidity of the battery module unit can be increased by means of horizontal bracing. As a result of providing a bracing element, the housing no longer has to have a load-bearing function, and therefore the housing can then be made of a very light material, in particular a very light plastics material.

The bracing element is preferably in the form of a frame and can enclose the at least two battery cells and/or the at least one battery module. Together with the battery cells or the battery modules, the bracing element also encloses the battery cooling elements, if present, which can be arranged in a packet with the battery cells or the battery modules. As a result of the frame-like design, the bracing element can be arranged peripherally around the battery cells or the battery modules and the optionally provided battery cooling elements.

In order to be able to increase or improve the effect of the horizontal bracing by means of the bracing element, two opposing transverse sides of the bracing element can be inclined at an angle $\alpha>0°$ with respect to a vertical Z-axis. As a result of the inclined arrangement of the two transverse sides of the bracing element, the position of the battery modules or the battery cells and the optionally provided battery cooling elements can be securely maintained, such that unwanted slipping or tilting of the battery modules or the battery cells and the optionally provided battery cooling elements can be prevented. In addition, tolerances can be compensated for thereby. The two transverse sides are preferably inclined at the same angle $\alpha$. The transverse sides are preferably inclined in such a way that they are arranged so as to extend toward one another in the direction of the underside of the housing, so that the space between the two transverse sides tapers in the direction of the underside of the housing. The angle $\alpha$ can be, for example, between 2° and 45°, preferably between 5° and 30°.

If the opposing transverse sides of the bracing element are inclined with respect to one another, a battery cooling element which comprises a wedge-shaped outer surface can be arranged between each of the transverse sides of the bracing element and a battery module of the at least one battery module and/or a battery cell of the at least two battery cells. The wedge shape of the battery cooling element can interact with the inclined arrangement of the relevant transverse side against which the battery cooling element rests. Due to the wedge shape, the transmission of contact pressure from the bracing element via the battery cooling element to the battery modules or the battery cells can be improved.

The battery cooling element can be designed and developed as described above.

In order to be able to further improve the positioning of the individual elements in a battery module unit, the battery cooling element can also be acted upon by a force acting vertically on the battery cooling element. The vertically acting force preferably acts perpendicularly to the contact pressure of the bracing element. The vertically acting force can be applied to the battery cooling element by a pulling element or a pressing element, for example. A pulling element can be provided, for example, which is fastened to the battery cooling element and the housing and/or the bracing element in order to apply the vertically acting force. The vertically acting force can be advantageous, particularly in combination with a wedge shape of a battery cooling element and an inclined arrangement of a transverse side of the bracing element.

The problem addressed by the invention is also solved by means of a battery module which comprises a housing, at least two battery cells arranged in the housing, and a bracing element by means of which the at least two battery cells are held braced in a horizontal direction extending parallel to the alignment of the underside.

If two or more battery cells are arranged in the housing, the battery cells can preferably be arranged in the housing so as to be self-supporting, and therefore the housing does not have to assume a load-bearing function. In order to achieve this, the battery module comprises a bracing element by means of which the at least two battery cells can be held braced in a horizontal direction extending parallel to the alignment of the underside. The bracing element is preferably arranged in the housing and surrounded by the housing. The bracing element can absorb the forces from the battery cells and also from optionally provided battery cooling elements, so that these forces are not then transmitted to the housing. The battery cells and the optionally provided battery cooling elements of a battery module unit can be combined in the form of a packet and held braced in the horizontal direction as a packet in the bracing element. The bracing element can thus absorb the weight of the battery cells and the optionally provided battery cooling elements. The bracing element can thus form a bearing element for the battery cells and the optionally provided battery cooling elements. The bracing element can press the battery cells and optionally provided battery cooling elements arranged in a packet against one another such that they are held braced against one another, without the need for additional fastening elements for the battery cells and/or the battery cooling elements in the housing. As a result of the horizontal bracing, the bracing element absorbs weight perpendicularly to the extension of the underside of the housing. The bracing element can allow the battery cells and the optionally provided battery cooling elements to be arranged in an accurately positioned manner and held in an accurately positioned manner in the housing, such that undesired slipping of the battery modules or the battery cells and/or the battery cooling elements with respect to one another can be prevented. Horizontal bracing by means of the bracing element can also compensate for manufacturing tolerances. In addition, the overall rigidity of the battery module can be increased by means of horizontal bracing.

The bracing element is preferably in the form of a frame and can enclose the at least two battery cells. Together with the battery cells, the bracing element can also enclose the optionally provided battery cooling elements which can be arranged in a packet with the battery cells. As a result of the frame-like design, the bracing element can be arranged peripherally around the battery cells and the optionally provided battery cooling elements.

In order to be able to increase or improve the effect of the horizontal bracing by means of the bracing element, two opposing transverse sides of the bracing element can be inclined at an angle β>0° with respect to a vertical Z-axis. As a result of the inclined arrangement of the two transverse sides of the bracing element, the position of the battery cells and the optionally provided battery cooling elements can be securely maintained, such that unwanted slipping or tilting of the battery cells and the optionally provided battery cooling elements can be prevented. In addition, tolerances can be compensated for thereby. The two transverse sides are preferably inclined at the same angle β. The transverse sides are preferably inclined in such a way that they are arranged so as to extend toward one another in the direction of the underside of the housing, so that the space between the two transverse sides tapers in the direction of the underside of the housing. The angle β can be, for example, between 2° and 45°, preferably between 5° and 30°.

If the opposing transverse sides of the bracing element are inclined with respect to one another, a battery cooling element which comprises a wedge-shaped outer surface can be arranged between each of the transverse sides of the bracing element and a battery cell of the at least two battery cells. The wedge shape of the battery cooling element can interact with the inclined arrangement of the relevant transverse side against which the battery cooling element rests. Due to the wedge shape, the transmission of contact pressure from the bracing element via the battery cooling element to the battery cells can be improved.

The battery cooling element can be designed and developed as described above.

In order to be able to further improve the positioning of the individual elements in a battery module, the battery cooling element can also be acted upon by a force acting vertically on the battery cooling element. The vertically acting force preferably acts perpendicularly to the contact pressure of the bracing element. The vertically acting force can be applied to the battery cooling element by a pulling element or a pressing element, for example. A pulling element can be provided, for example, which is fastened to the battery cooling element and the housing and/or the bracing element in order to apply the vertically acting force. The vertically acting force can be advantageous, particularly in combination with a wedge shape of a battery cooling element and an inclined arrangement of a transverse side of the bracing element.

BRIEF DESCRIPTION OF THE DRAWINGS

The invention is explained in greater detail in the following with reference to the accompanying drawings using preferred embodiments.

In the drawings:

FIG. 3b is a schematic sectional view in the transverse direction of the battery cooling element shown in FIG. 3a, FIG. 4 is a schematic sectional view in the transverse direction of a further battery cooling element, FIG. 5 is a schematic sectional view through a film formed as an outer surface according to the invention.

DETAILED DESCRIPTION

Figure 1:
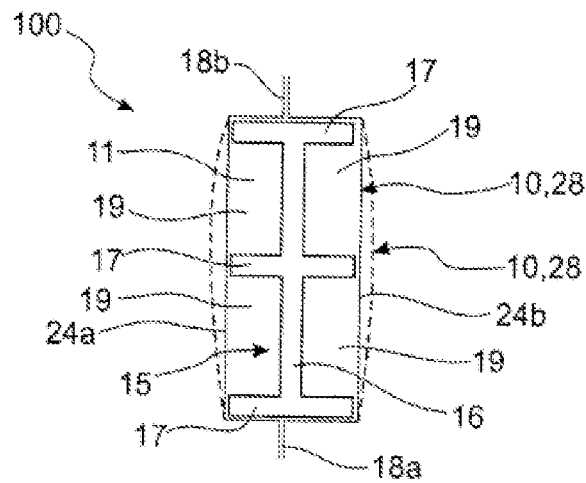
FIG. 1 is a schematic sectional view in the transverse direction of a battery cooling element according to the invention.

FIG. 1 schematically shows a battery cooling element 100 in a cross-sectional view along a transverse side of the battery cooling element 100.

Figure 7:
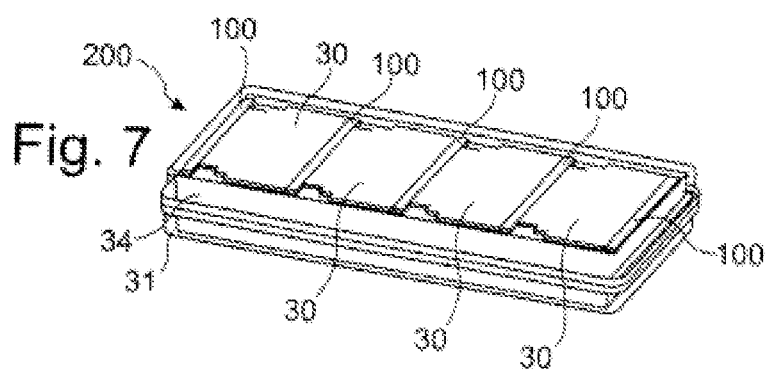
FIG. 7 is a schematic view of the battery module unit shown in FIG. 6 in an assembled state.
Figure 8:
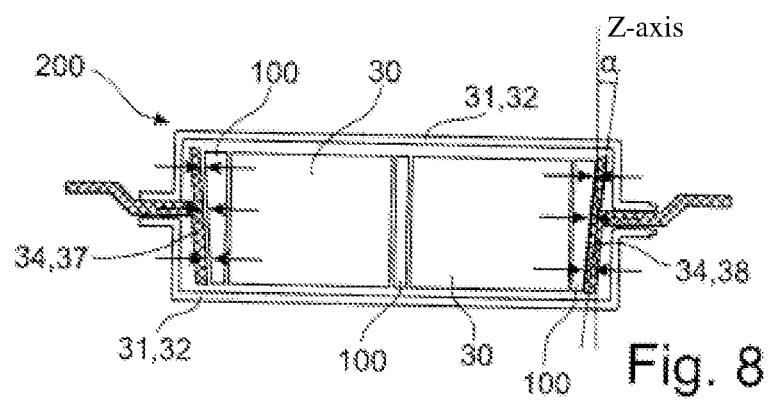
FIG. 8 is a schematic sectional view through a battery module unit according to the invention.
Figure 9:
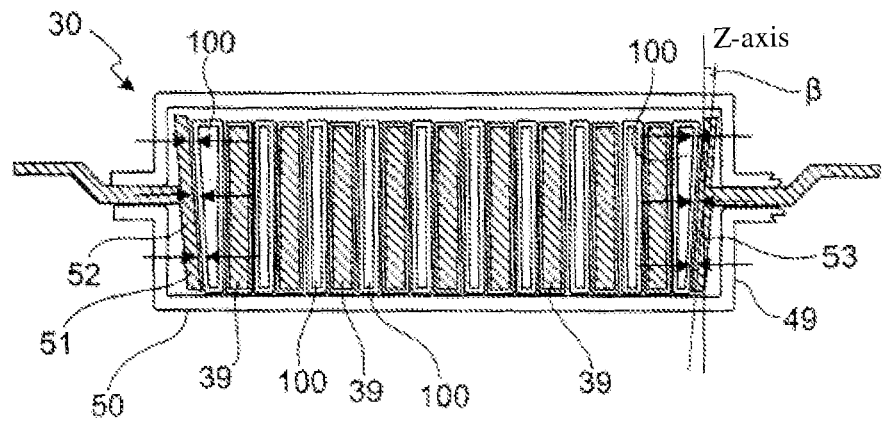
FIG. 9 is a schematic sectional view of a battery module according to the invention.

The battery cooling element 100 comprises an outer surface 10 for resting against a battery module 30, as shown in FIG. 5 to 15, of a battery module unit 200 and/or for resting against a battery cell 39, as shown in FIG. 9, of a battery module unit 200.

Figure 2A:
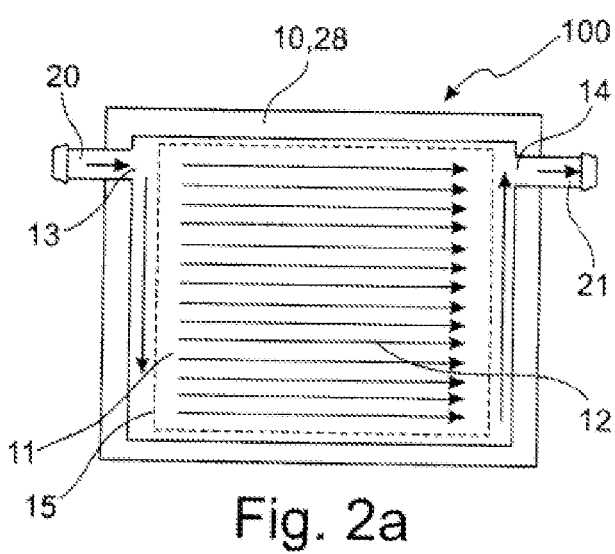
FIG. 2a is a schematic sectional view in the longitudinal direction of a further battery cooling element according to the invention.

The outer surface 10 surrounds or defines an inner chamber 11 of the battery cooling element 100, a cooling medium 12 flowing through the inner chamber 11, as indicated by the arrows in FIG. 2a and FIG. 3a, for example. In this case, the cooling medium 12 flows from a cooling medium inlet 13, via which the cooling medium 12 flows into the inner chamber 11, to a cooling medium outlet 14, via which the cooling medium 11 is discharged back out of the inner chamber when it has absorbed the heat from the battery module 30 to be cooled or the battery cells 39 to be cooled.

The outer surface 10 of the battery cooling element 100 is made, at least in regions or in portions, of a thermally conductive, flexible film 28 which can be deformed by means of the fluid pressure of the cooling medium 12 flowing through the inner chamber 11. If, for example, the fluid pressure is increased, the outer surface 10 or the film 28 is bulged outward, as indicated by the dashed line in FIG. 1, for example. The outward bulge of the outer surface 10 or the film 28 can ensure secure, flat contact of the outer surface 10 against an adjacent battery module 30 or battery cell 39 to be cooled, it being possible to compensate for tolerances or unevenness.

The film 28 forming the outer surface 10 is, as illustrated for example in the embodiments shown in FIG. 1 to 4, welded peripherally around the inner chamber 11, as is shown by way of example by means of the ends 18a, 18b of the film 28. At the ends 18a, 18b, two film portions of the film 28 are arranged one on top of the other and are integrally interconnected by a welded connection.

In the embodiment shown in FIG. 1, a support element 15 is arranged in the inner chamber 11 of the battery cooling element 100 in order to increase the stability of the battery cooling element 100. In contrast to the outer surface 10 or the film 28 of the battery cooling element 100, the support element 15 is rigid. The outer surface 10 can rest against the support element 15 at least in regions, in particular if the outer surface 10 is not bulged outward due to the fluid pressure.

In the embodiment shown in FIG. 1, the support element 15 comprises a main rib 16 and three secondary ribs 17 which are all aligned at a 90° angle with respect to the main rib 16. The main rib 16 extends in a vertical direction of the battery cooling element 100, whereas the secondary ribs 17 extend in a horizontal direction of the battery cooling element 100. The secondary ribs 17 are arranged parallel to and spaced apart from one another. The secondary ribs 17, together with the main rib 16, form a plurality of flow channels 19 through which the cooling medium 12 flows in order to flow through the inner chamber 11. In the embodiment shown in FIG. 1, four flow channels 19 are formed.

Figure 2B:
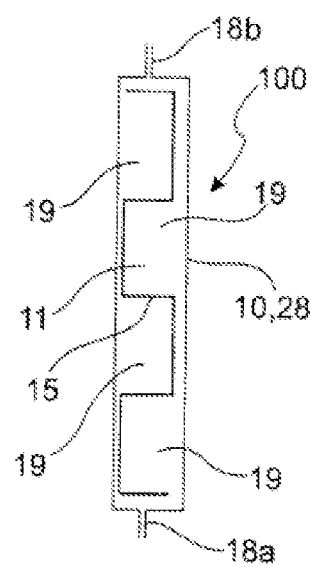
FIG. 2b is a schematic sectional view in the transverse direction of the battery cooling element shown in FIG. 2a, FIG. 3a is a schematic sectional view in the longitudinal direction of a further battery cooling element according to the invention.

FIG. 2a and FIG. 2b show a further embodiment of a battery cooling element 100, which merely differs from the embodiment shown in FIG. 1 on account of the shape of the support element 15. The support element 15 shown in FIG. 2a and FIG. 2b has a meandering configuration, in which the support element 15 comprises a plurality of U-shaped flow channels 19 arranged one behind the other, the flow channels 19 extending parallel to one another. In the embodiment shown in FIG. 2a and FIG. 2b, four flow channels 19 are arranged so as to extend parallel to one another.

Furthermore, in the embodiment shown in FIGS. 2a and 2b, it can be seen that an inlet connector 20 is arranged on the cooling medium inlet 13 and an outlet connector 21 is arranged on the cooling medium outlet 14. Both the inlet connector 20 and the outlet connector 21 are welded to the film 28 forming the outer surface 10 in a liquid-tight manner.

A further possible embodiment of a battery cooling element 100 is shown in FIG. 3a and FIG. 3b. In the embodiment shown in FIGS. 3a and 3b, there is no support element arranged in the inner chamber 11, but instead the film 28 forming the outer surface 10 is shaped in such a way that it creates a self-supporting effect for the battery cooling element 100. For this purpose, parts of the film 28 forming the outer surface 10 protrude into the inner chamber 11. Walls 23 projecting into the inner chamber 11 are in this case formed on an inside 22 of the film 28 forming the outer surface 10, which inside faces the inner chamber 11, which walls are formed as one piece with the film 28 forming the outer surface 10 and are thus made of the same material as the film 28. The walls 23 form ribs which are aligned at a right angle with respect to the inside 22 of the film 28 forming the outer surface 10. These walls 23 can form a meandering flow channel in the inner chamber 11 of the battery cooling element 100 for the cooling medium 12. The flow of the cooling medium 12 through the meandering flow channel 19 formed in the inner chamber 11 is shown in FIG. 3a by the dashed line.

FIG. 4 shows an embodiment of a battery cooling element 100 in which the outer surface 10 is wedge-shaped. In this case, the longitudinal side surfaces 24a, 24b of the outer surface 10 extend toward one another from the second end 18b to the first end 18a of the film 28 or the outer surface 10 such that the battery cooling element 100 tapers from the second end 18b to the first end 18a.

In the embodiment shown in FIG. 4, a support element 15 is arranged in the inner chamber 11, which support element comprises a main rib 16 and four secondary ribs 17 extending from the main rib 16 at a right angle. Here, the main rib 16 is not arranged in the center of the inner chamber 11, as in the embodiment shown in FIG. 1, so that the two longitudinal side surfaces 24a, 24b of the film 28 forming the outer surface 10 can be deformed, but instead, in the embodiment shown in FIG. 4, the main rib 16 is arranged off-center on an edge of the inner chamber 11, so that one of the longitudinal side surfaces 24a rests directly against the main rib 16. This longitudinal side surface 24a cannot be deformed by the fluid pressure of the cooling medium 12. In the embodiment shown in FIG. 4, only the opposite longitudinal side surface 24b can be deformed by the fluid pressure of the cooling medium 12, as indicated in FIG. 4 by the dashed line. The deformation of the longitudinal side surface 24*b* and thus of the film 28 forming the outer surface 10 in the direction of the inner chamber 11 is limited by the secondary ribs 17.

A battery cooling element 100 as shown in FIG. 4 is preferably arranged on the outside of a battery module unit, such that only one side, specifically the longitudinal side surface 24*b*, of the battery cooling element 100 rests against a battery module 30.

FIG. 5 is a cross-sectional view through a possible structure of the film 28 forming the outer surface 10, the film 28 in this case being formed from a multilayer composite. In this case, the film 28 forming the outer surface 10 is formed from three layers, the inner layer 25 being made of a metal material, for example aluminum, and the two outer layers 26, 27 each being made of a plastics material, for example polyethylene.

Figure 6:
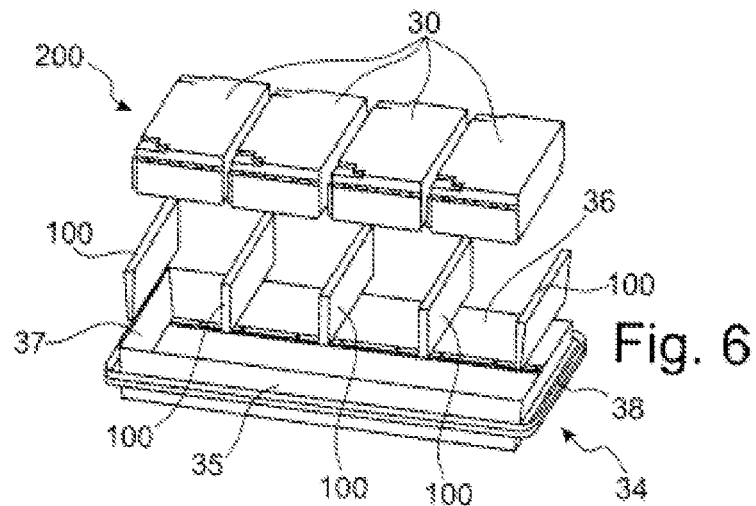
FIG. 6 is a schematic exploded view of a battery module unit according to the invention.

FIG. 6 is an exploded view of a battery module unit 200, which is shown in FIG. 7 in an assembled state. In the embodiment shown in FIGS. 6 and 7, this battery module unit has four battery modules 30 arranged next to one another and five battery cooling elements 100, the battery modules 30 being arranged between the battery cooling elements 100 such that the battery modules 30 are each cooled by battery cooling elements 100 on two sides. FIG. 6 shows an example embodiment, wherein a battery module unit 200 can also comprise more or fewer battery modules 30 and more or fewer battery cooling elements 100. FIG. 8 shows, for example, an embodiment in which the battery module unit 200 comprises two battery modules 30 and three battery cooling elements 100.

The battery cooling elements 100 each arranged between two battery modules 30 can, for example, have a configuration as shown in FIG. 1, FIG. 2*a*, FIG. 2*b*, FIG. 3*a* and FIG. 3*b*. The battery cooling elements 100 arranged between two battery modules 30 are each rectangular. The two outer battery cooling elements 100, however, are designed according to the embodiment shown in FIG. 4, in that their outer surface 10 is wedge-shaped.

The battery modules 30 and the battery cooling elements 100 are arranged in a housing 31, as shown in FIG. 7 and FIG. 8, which comprises a top side 32 and an underside 33. The housing 31 does not have a load-bearing function and can therefore be made of a plastics material.

The battery cooling elements 100 are aligned vertically with respect to the underside 33 of the housing 31, such that the battery cooling elements 100 are positioned so as to be standing perpendicularly on the underside 33 of the housing 31. As a result of arranging the battery cooling elements 100 to be perpendicularly standing, it is possible to transfer heat horizontally from the battery modules 30 to the battery cooling elements 100, so that the heat can be transferred parallel to the extension of the underside 33 of the housing 31.

A bracing element 34 is also arranged in the housing 31. The bracing element 34 is in the form of a frame and encloses the battery cooling elements 100 and battery modules 30 arranged as a packet. The battery cooling elements 100 and the battery modules 30 are thus surrounded by the bracing element 34. By means of the bracing element 34, the battery modules 30 and the battery cooling elements 100 are held braced in a horizontal direction extending parallel to the alignment of the underside 33, as indicated by the arrows in FIG. 8.

The bracing element 34 comprises two opposing longitudinal sides 35, 36 and two opposing transverse sides 37, 38. The two longitudinal sides 35, 36 are aligned parallel to one another. The two transverse sides 37, 38, however, are inclined at an angle $\alpha > 0°$ with respect to a vertical Z-axis. In the embodiment shown here, the angle $\alpha$ is approximately 10°, as can be seen in the sectional view of FIG. 8. The two transverse sides 37, 38 are in this case inclined at the same angle $\alpha$. The transverse sides 37, 38 are inclined in such a way that they are arranged so as to extend toward one another in the direction of the underside 33 of the housing 31, so that the space between the two transverse sides 37, 38 tapers in the direction of the underside 33 of the housing 31, as can be seen in FIG. 8.

The battery cooling element 100 arranged between each one of the transverse sides 37, 38 and a battery module 30 has a wedge shape, as shown in FIG. 4, which is adapted to the inclination of the transverse sides 37, 38. The longitudinal side surface 24*a* of the wedge-shaped battery cooling element 100 thereby rests against the transverse side 37, 38 of the bracing element 34, and the longitudinal side surface 24*b* thereof rests against the battery module 30 in order to cool said module.

FIG. 9 is a sectional view of a battery module 30, as shown in FIG. 6 to 8, for example. In the battery module 30, a plurality of battery cells 39 are arranged in a housing 49 so as to be standing or hanging one behind the other perpendicularly with respect to an underside 50 of the housing 49. As a result of arranging the battery cooling elements 100 to be perpendicularly standing, it is possible to transfer heat horizontally from the battery cells 39 to the battery cooling elements 100, so that the heat can be transferred parallel to the extension of the underside 50 of the housing 49.

A battery cooling element 100 is arranged between adjacent battery cells 39 in each case. Battery cooling elements 100 and battery cells 39 are thus arranged alternately one behind the other, the two outer elements being formed by battery cooling elements 100. The two battery cooling elements 100 positioned on the outside are also wedge-shaped in this case, with the other battery cooling elements 100 that are arranged between the battery cells 39 being rectangular.

The housing 50 does not have a load-bearing function and can therefore be made of a plastics material.

A bracing element 51 is also arranged in the housing 49. The bracing element 51 is in the form of a frame and encloses the battery cooling elements 100 and battery cells 39 arranged as a packet. The battery cooling elements 100 and the battery cells 39 are thus surrounded by the bracing element 34. By means of the bracing element 34, the battery cells 39 and the battery cooling elements 100 are held braced in a horizontal direction extending parallel to the alignment of the underside 50, which direction extends perpendicularly with respect to the Z-axis indicated in FIG. 9.

The bracing element 51 comprises two opposing longitudinal sides (not shown) and two opposing transverse sides 52, 53, the transverse sides 52, 53 being interconnected via the two longitudinal sides. The two longitudinal sides are aligned parallel to one another. The two transverse sides 52, 53, however, are inclined at an angle $\beta > 0°$ with respect to a vertical Z-axis. In the embodiment shown here, the angle $\beta$ is approximately 10°, as can be seen in the sectional view of FIG. 9. The two transverse sides 52, 53 are in this case inclined at the same angle $\beta$. The transverse sides 52, 53 are inclined in such a way that they are arranged so as to extend toward one another in the direction of the underside 50 of the housing 49, so that the space between the two transverse sides 52, 53 tapers in the direction of the underside 50 of the housing 49, as can be seen in FIG. 9.

The battery cooling element 100 arranged between each one of the transverse sides 52, 53 and a battery cell 39 has a wedge shape, as shown in FIG. 4, which is adapted to the inclination of the transverse sides 52, 53. The longitudinal side surface 24a of the wedge-shaped battery cooling element 100 thereby rests against the transverse side 52, 53 of the bracing element 51, and the longitudinal side surface 24b thereof rests against the battery cell 39 in order to cool said cell.

Figure 10:
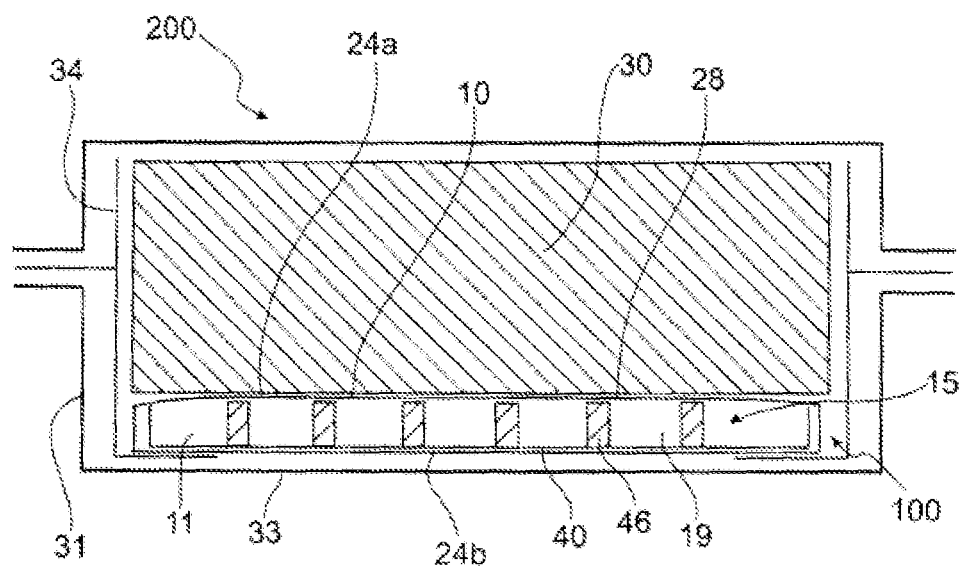
FIG. 10 is a schematic sectional view of a further battery module unit according to the invention.

In the embodiment of a battery module unit 200 shown in FIG. 10, a battery cooling element 100 is arranged parallel or horizontally to the underside 33 of the housing 31, so that the battery cooling element 100 is arranged between a battery module 30 as shown here and the underside 33 of the housing 31. Instead of the battery module 30 shown in FIG. 10, a plurality of battery modules 30 or a plurality of battery cells 39 can also be arranged next to one another in this case, which modules or cells are then arranged on the battery cooling element 100.

The battery cooling element 100 shown in FIG. 10 also comprises an outer surface 10 which is formed of a thermally conductive, flexible film 28, so that the inner chamber 11 of the battery cooling element 100 is surrounded by the film 28. The cooling means inlet and the cooling means outlet are not shown in FIG. 10.

The battery cooling element 100 is arranged in this case so as to have its longitudinal side surface 24b adjacent to the underside 33 of the housing 31. The longitudinal side surface 24b of the battery cooling element 100 extends parallel to the underside 33 of the housing 31. The longitudinal side surface 24a is oriented in the direction of the battery module 30 and can bulge in the direction of the battery module 30 depending on the fluid pressure of the cooling medium, in order to be able to rest as flat as possible against the battery module 30.

A support element 15 is arranged in the inner chamber 11 of the battery cooling element 100. In the embodiment shown here, the support element 15 is formed from a U-shaped plate element 40. Furthermore, the support element 15 comprises a plurality of blocks 46 which are arranged on the plate element 40. The blocks 46 are fastened to the plate element 40 spaced apart from one another. A flow channel 19 can be formed between the blocks 46. The blocks 46 can be positioned with respect to one another in such a way that a meandering flow channel 19 is formed. The blocks 46 are preferably rib-like. The blocks 46 thus form boundary walls for the cooling medium 12 when it flows through the inner chamber 11.

Figure 11:
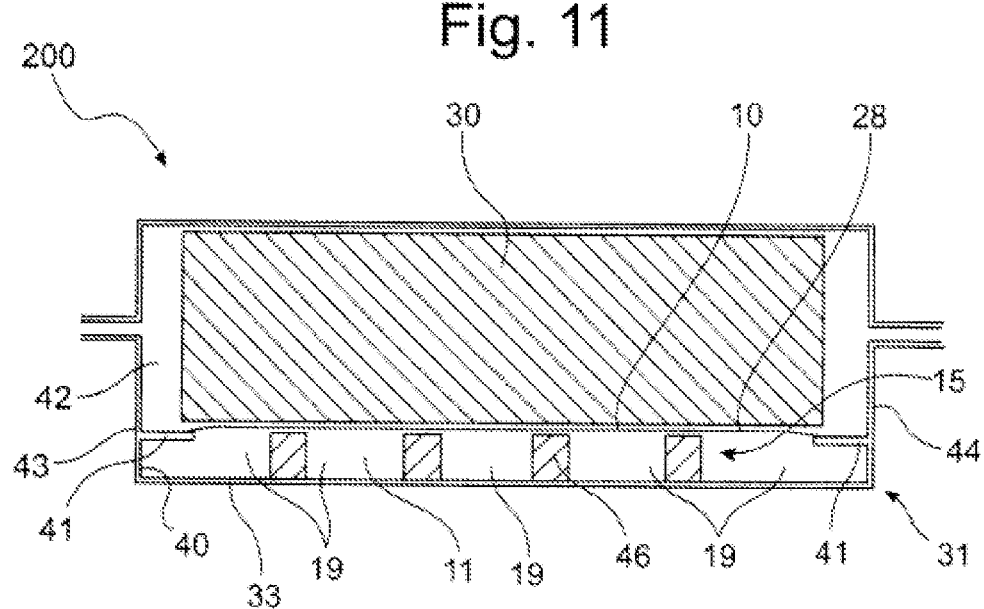
FIG. 11 is a schematic sectional view of a further battery module unit, in which the battery cooling element is integrated into the housing of the battery module unit.

In the embodiment shown in FIG. 11, the battery cooling element 100 is integrated into the housing 31. The battery cooling element 100 is in this case formed at least in regions as one piece with the housing 31, so that at least part of the outer peripheral surface of the battery cooling element 100 is formed by the housing 31, in particular by the underside 33 of the housing 31.

In the embodiment shown in FIG. 11, a bracing element is not provided, and instead the housing 31 itself has a load-bearing function. On the housing 31, in particular on the inside 40 of the housing 31, a preferably peripheral rib 41 is formed which protrudes into the inner chamber 42 of the housing 31, in which the battery modules 30 and/or battery cells 39 and battery cooling elements 100 are also arranged.

The outer surface 10 of the battery cooling element 100, which surface rests against the battery module 30 shown here and is formed at least in regions from the film 28, is connected to the housing 31. The outer surface 10 or the film 28 is in this case connected to the rib 41. The connection of the film 28 to the rib 41 can be formed, for example, by a welded connection or an adhesive connection. Furthermore, the outer surface 10 or the film 28 can also be connected to the housing 31 by means of injection molding using material of the housing 31.

In the embodiment shown in FIG. 11, the inner chamber 11 of the battery cooling element 100 is delimited by the underside 33 of the housing 31, by the film 28 and by regions of the transverse sides 43, 44 of the housing 31.

In the embodiment shown in FIG. 11, a support element 15 is also arranged in the inner chamber 11, which support element is formed from a plurality of blocks 46 which are preferably rib-like. The blocks 46 are arranged spaced apart from one another, so that a flow channel 19 is formed between the blocks 46, which flow channel can be formed in a meandering manner in accordance with the positioning of the blocks 46 in relation to one another. The blocks 46 are arranged on the underside 33 of the housing 31. The blocks 46 are preferably fastened to the inside 40 of the housing 31 in the region of the underside 33 of the housing 31.

The cooling medium inlet and the cooling medium outlet are not indicated in FIG. 11. A cooling medium flows through the inner chamber 11, it being possible for the film 28 to be bulged in the direction of the battery module 30 or in the direction of the battery cells in the housing 31 depending on the fluid pressure of the cooling medium. The cooling medium inlet and the cooling medium outlet of the battery cooling element 100 can be integrated directly into the housing 31, and therefore additional lines to be introduced into the housing 31 for the supply and removal of cooling medium can be dispensed with.

Figure 12:
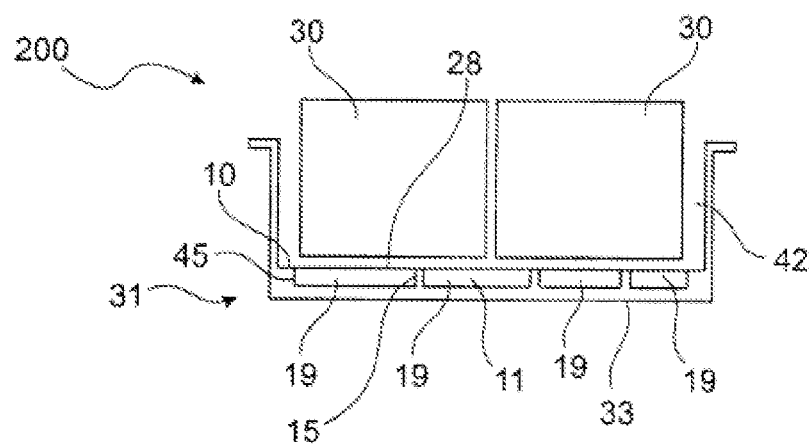
FIG. 12 is a schematic sectional view of a further battery module unit, in which the battery cooling element is integrated into the housing of the battery module unit.

FIG. 12 shows an embodiment similar to the embodiment shown in FIG. 11, in which the battery cooling element 100 is integrated into the housing 31. In this case, the housing 31 comprises a bearing element 45 which forms part of the outer peripheral surface of the battery cooling element 100. The bearing element 45 is inserted into the inner chamber 42 of the housing 31. The bearing element 45 can be formed as a separate part from the housing 31 or as one piece with the housing 31. The bearing element 45 is positioned in such a way that the battery cooling element 100 extends horizontally and thus parallel to the underside 33 of the housing 31. The end portions of the film 28 are fastened to the bearing element 45. The bearing element 45 is shaped in such a way that, as can also be seen in FIG. 13, it forms a meandering flow channel 19. As can also be seen in FIG. 13, the cooling medium inlet 13 and the cooling medium outlet 14 are integrated into the housing 31. As well as forming an outer peripheral surface of the battery cooling element 100, the bearing element 45 also forms a support element 15 in the inner chamber 11 of the battery cooling element 100.

Figure 13:
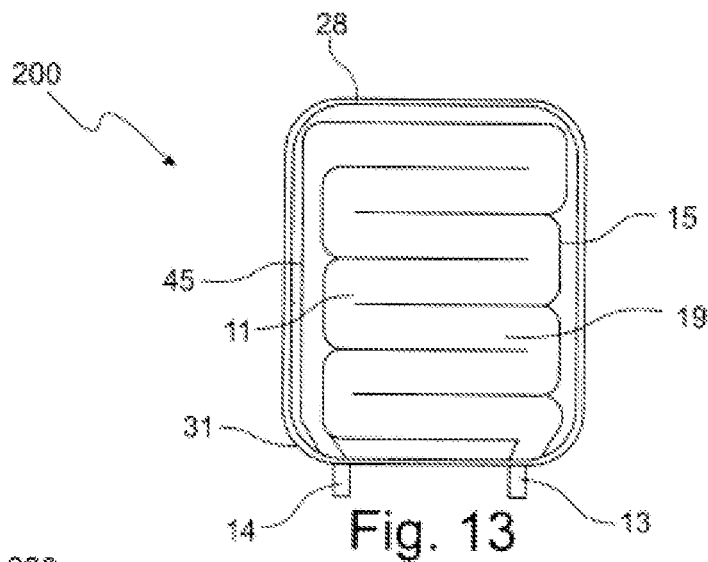
FIG. 13 is a schematic sectional plan view of the battery module unit shown in FIG. 12.

In the embodiment shown in FIGS. 12 and 13, the battery modules 13 and/or the battery cells 39 are positioned on the battery cooling element 100.

Figure 14:
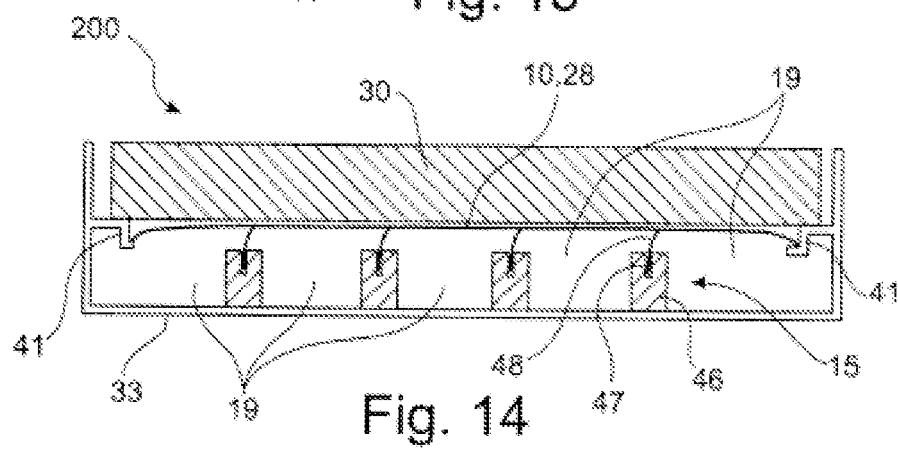
FIG. 14 is a schematic sectional view of a further battery module unit, in which the battery cooling element is integrated into the housing of the battery module unit.
Figure 15:
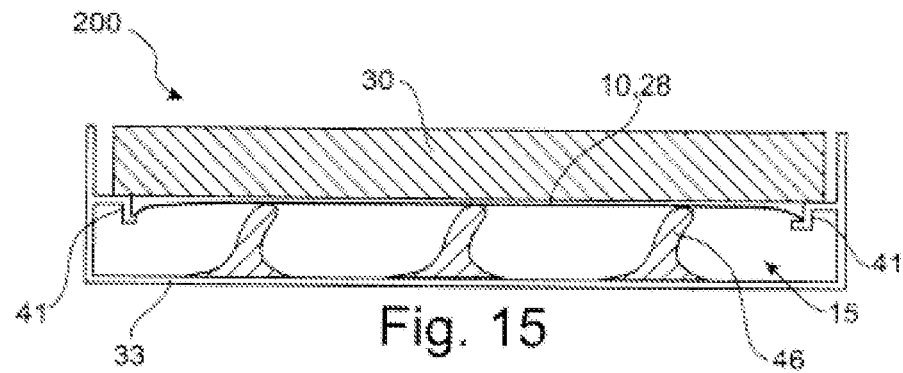
FIG. 15 is a schematic sectional view of a further battery module unit, in which the battery cooling element is integrated into the housing of the battery module unit.

FIGS. 14 and 15 show embodiments that are similar to the embodiment shown in FIG. 11.

In the embodiments shown in FIGS. 14 and 15, part of the support element 15 is resilient at least in regions. As a result of the resilient design at least in regions, an overflow seal can be formed which prevents the cooling medium 12 from flowing through a gap between the blocks 46 and the film 28 and thus not along the actual flow channel 19. The formation of a gap of this kind can be prevented by the resilient design, since the resilient design can ensure that the construction of the support element 15 remains sealingly resting against the film 28 even if the film 28 is bulged.

The resilient design is preferably provided in the region of the blocks 46. The resilient design can be achieved by using an elastomeric plastics material. In order to be able to particularly efficiently prevent the cooling medium 12 from overflowing, the support element 15 is inclined, in the regions in which it is resilient, in the direction of the cooling medium inlet 13, as can be seen in FIGS. 14 and 15, so that the resilient regions form an arc shape.

In the embodiment shown in FIG. 14, for the resilient design, an in particular groove-shaped recess 47 is formed in each of the blocks 46, into which recess a resilient strip-shaped body 48 is inserted. The strip-shaped body 48 can be integrally, force-fittingly and/or form-fittingly fastened in the groove-shaped recess 47. The resilient design of the support element 15 can be achieved by means of the strip-shaped body 48. The strip-shaped bodies 48 form an overflow seal for the cooling medium 12 in that the strip-shaped bodies 48 sealingly rest against the film 28. In the embodiment shown here, the strip-shaped bodies 48 are not straight, but instead are curved or inclined, whereby the contact surface of the strip-shaped bodies 48 against the film 28 can be enlarged, which in turn can improve the sealing.

FIG. 15 shows an embodiment in which the blocks 46 themselves form the resilient design of the support element 15. In this case, each block 46 is made entirely of a resilient plastics material. However, it is also possible for the blocks 46 to be only partially made of a resilient plastics material. In the embodiment shown in FIG. 15, the resilient design of the entire block 46 also means that the entire block 46 is inclined. The entire block 46 thus forms an overflow seal.

LIST OF REFERENCE SIGNS

100 Battery cooling element
200 Battery module unit
10 Outer surface
11 Inner chamber
12 Cooling medium
13 Cooling medium inlet
14 Cooling medium outlet
15 Support element
16 Main rib
17 Secondary rib
18a First end
18b Second end
19 Flow channel
20 Inlet connector
21 Outlet connector
22 Inside
23 Wall
24a, 24b Longitudinal side surface
25 Inner layer
26 Outer layer
27 Outer layer
28 Film
30 Battery module
31 Housing
32 Top side
33 Underside
34 Bracing element
35 Longitudinal side
36 Longitudinal side
37 Transverse side
38 Transverse side
39 Battery cell
40 Plate element
41 Rib
42 Inner chamber
43 Transverse side
44 Transverse side
45 Bearing element
46 Block
47 Groove-shaped recess
48 Strip-shaped body
49 Housing
50 Underside
51 Bracing element
52 Transverse side
53 Transverse side

What is claimed is:

1. A battery module, comprising a housing, at least two battery cells arranged in the housing, and comprising at least one battery cooling element arranged in the housing, the battery cooling element comprising:
    an outer surface for resting at least in regions against a battery cell and/or for resting at least in regions against a battery module comprising at least two battery cells;
    an inner chamber for receiving a cooling medium, which inner chamber is surrounded at least in regions by the outer surface; and
    a cooling medium inlet connected to the inner chamber and a cooling medium outlet connected to the inner chamber;
        the outer surface being made, at least in regions, of a thermally conductive, flexible film which is shapeable by a fluid pressure of the cooling medium, wherein at least two battery cooling elements are arranged in the housing, which battery cooling elements are arranged so as to be aligned vertically with respect to the underside of the housing,
    wherein a support element is arranged in the inner chamber, the inner chamber comprising a first longitudinal side surface and a second longitudinal side surface opposite the first longitudinal side surface,
    wherein the support element comprises a main rib and at least two secondary ribs aligned at a 90° angle with respect to the main rib, and the first longitudinal side surface rests directly against the main rib.

2. The battery module according to claim 1, wherein the film is formed from a multilayer composite.

3. The battery module according to claim 2, wherein the multilayer composite comprises a plastics material and a metal material.

4. The battery module according to claim 3, wherein the plastics material is made of a polyethylene, polyisobutylene, polyvinyl butyral, ethylene vinyl acetate, polyacrylate, polymethylene acrylate, polyurethane, pre-stretched polypropylene, polyvinyl acetate 5, ethylene vinyl acetate and/or a thermoplastic elastomer based on urethane.

5. The battery module according to claim 1, wherein the support element has a meandering shape.

6. The battery module according to claim 1, wherein the support element is resilient at least in regions.

7. The battery module according to claim 1, wherein the film is shaped in such a way that the film forms a meandering flow channel in the inner chamber.

8. The battery module according to claim 1, wherein the outer surface is wedge-shaped.

9. The battery module according to claim 1, wherein the cooling medium inlet has an inlet connector and the cooling medium outlet has an outlet connector, the inlet connector and the outlet connector being welded to the film forming the outer surface.

10. The battery module according to 1, wherein a bracing element is provided, by means of which the at least two battery cells and the at least one battery cooling element are held braced in a horizontal direction extending parallel to the alignment of the underside.

11. The battery module according to claim 10, wherein the bracing element is in the form of a frame and encloses the at least two battery cells and the at least one battery cooling element.

12. The battery module according to 10, wherein two opposing transverse sides of the bracing element are inclined at an angle $\beta>0°$ with respect to a vertical Z-axis.

13. The battery module according to claim 12, wherein a wedge-shaped battery cooling element is arranged between each of the transverse sides of the bracing element and a battery cell of the at least two battery cells.

14. The battery module according to claim 1, wherein the battery module comprises a bracing element by means of which the at least two battery cells are held braced in a horizontal direction extending parallel to the alignment of the underside.

15. The battery module according to claim 14, wherein the bracing element is in the form of a frame and encloses the at least two battery cells.

16. The battery module according to claim 14, wherein two opposing transverse sides of the bracing element are inclined at an angle $\beta>0°$ with respect to a vertical Z-axis.

17. The battery module according to claim 16, wherein a wedge-shaped battery cooling element is arranged between each of the transverse sides of the bracing element and a battery cell of the at least two battery cells.

18. A battery module unit, comprising:
a housing comprising a top side and an underside;
at least one battery cooling element; and
at least one battery module according to claim 1 comprising at least two battery cells.

19. The battery module unit according to claim 18, wherein at least two battery cooling elements are arranged in the housing, which battery cooling elements are arranged so as to be aligned vertically with respect to the underside of the housing.

20. The battery module unit according to claim 18, wherein a bracing element is provided, by means of which the at least two battery cells and/or the at least one battery module are held braced in a horizontal direction extending parallel to the alignment of the underside.

21. The battery module unit according to claim 20, wherein the bracing element is in the form of a frame and encloses the at least two battery cells and/or the at least one battery module.

22. The battery module unit according to claim 20, wherein two opposing transverse sides of the bracing element are inclined at an angle $\alpha>0°$ with respect to a vertical Z-axis.

23. The battery module unit according to claim 22, wherein a battery cooling element which comprises a wedge-shaped outer surface is arranged between each of the transverse sides of the bracing element and a battery module of the at least one battery module and/or a battery cell of the at least two battery cells.

24. The battery module unit according to claim 18, wherein at least one of the at least one battery cooling elements is arranged so as to be aligned horizontally with respect to the underside of the housing.

25. The battery module unit according to claim 18, wherein the housing is made of a plastics material.

26. The battery module unit according to claim 18, wherein the battery cooling element is integrated into the housing.

27. The battery module unit according to claim 26, wherein part of an outer peripheral surface of the battery cooling element is formed by the underside of the housing.

28. The battery module unit according to claim 26, wherein the film of the battery cooling element is fastened to the housing.

29. The battery module unit according to claim 26, wherein the housing has a bearing element to which the film of the battery cooling element is fastened.

30. A battery module unit, comprising:
a housing comprising a top side and an underside;
at least one battery module according to claim 1 comprising at least two battery cells; and
a bracing element by means of which the at least one battery module are held braced in a horizontal direction extending parallel to the alignment of the underside.

31. The battery module unit according to claim 30, wherein the bracing element is in the form of a frame and encloses the at least one battery module.

32. The battery module unit according to claim 30, wherein two opposing transverse sides of the bracing element are inclined at an angle $\alpha>0°$ with respect to a vertical Z-axis.

33. The battery module unit according to claim 32, wherein a battery cooling element which comprises a wedge-shaped outer surface is arranged between each of the transverse sides of the bracing element and a battery module of the at least one battery module and/or a battery cell of the at least two battery cells.

* * * * *